(12) United States Patent
Lin et al.

(10) Patent No.: US 11,350,440 B2
(45) Date of Patent: May 31, 2022

(54) INFORMATION TRANSMISSION METHOD, TERMINAL APPARATUS, AND NETWORK APPARATUS

(71) Applicant: Guangdong OPPO Mobile Telecommunications Corp., Ltd., Guangdong (CN)

(72) Inventors: Yanan Lin, Guangdong (CN); Hua Xu, Ottawa (CA)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 594 days.

(21) Appl. No.: 16/332,565

(22) PCT Filed: Nov. 30, 2016

(86) PCT No.: PCT/CN2016/108017
§ 371 (c)(1),
(2) Date: Mar. 12, 2019

(87) PCT Pub. No.: WO2018/098683
PCT Pub. Date: Jun. 7, 2018

(65) Prior Publication Data
US 2021/0307047 A1    Sep. 30, 2021

(51) Int. Cl.
*H04W 72/12*    (2009.01)
*H04L 5/00*    (2006.01)
*H04W 72/04*    (2009.01)

(52) U.S. Cl.
CPC ....... *H04W 72/1289* (2013.01); *H04L 5/0007* (2013.01); *H04W 72/042* (2013.01);
(Continued)

(58) Field of Classification Search
CPC ......... H04W 72/1289; H04W 72/0453; H04W 72/0446; H04W 72/1257; H04W 72/042; H04L 5/0007
See application file for complete search history.

(56) References Cited

U.S. PATENT DOCUMENTS

2008/0189360 A1    8/2008   Kiley et al.
2009/0296624 A1*  12/2009   Ryu ..................... H04N 21/235
                                                              370/312
(Continued)

FOREIGN PATENT DOCUMENTS

CL    201801451    6/2018
CL    201900193    4/2019
(Continued)

OTHER PUBLICATIONS

Canadian Examination Report for GA Application 3045200 dated May 28, 2021. (5 pages).
(Continued)

*Primary Examiner* — Christine Ng
(74) *Attorney, Agent, or Firm* — Young Basile Hanlon & MacFarlane, P.C.

(57) ABSTRACT

A method, a network device and a terminal device for transmitting information are provided. The method includes: a network device sends downlink control information to a terminal device through control resource areas in a time domain scheduling unit, wherein the control resource areas include multiple types of control resource areas, different types of control resource areas are used for sending different types downlink control information, and a first type of control resource area in the multiple types of control resource areas comprises partial frequency domain resources pre-configured or semi-statically configured on
(Continued)

each Orthogonal Frequency Division Multiplexing (OFDM) symbol in the time domain scheduling unit.

31 Claims, 7 Drawing Sheets

(52) U.S. Cl.
CPC ... *H04W 72/0446* (2013.01); *H04W 72/0453* (2013.01); *H04W 72/1257* (2013.01)

(56) References Cited

U.S. PATENT DOCUMENTS

| | | | | |
|---|---|---|---|---|
| 2012/0063413 | A1* | 3/2012 | Kroener | H04W 72/04 370/330 |
| 2012/0147831 | A1* | 6/2012 | Golitschek | H04L 1/0026 370/329 |
| 2012/0178482 | A1* | 7/2012 | Seo | H04L 1/1854 455/501 |
| 2013/0077583 | A1* | 3/2013 | Kim | H04W 72/048 370/329 |
| 2013/0128826 | A1 | 5/2013 | Lin et al. | |
| 2014/0064235 | A1* | 3/2014 | Seo | H04W 72/0406 370/329 |
| 2014/0161088 | A1 | 6/2014 | Seo et al. | |
| 2014/0286302 | A1* | 9/2014 | Khoryaev | H04W 28/0268 370/330 |
| 2014/0307679 | A1* | 10/2014 | Ding | H04W 72/1278 370/329 |
| 2015/0350941 | A1 | 12/2015 | You et al. | |
| 2015/0358997 | A1 | 12/2015 | Yang et al. | |
| 2016/0044619 | A1 | 2/2016 | Ryu et al. | |
| 2016/0269212 | A1 | 9/2016 | Vilaipornsawai et al. | |
| 2016/0270073 | A1 | 9/2016 | Ye et al. | |
| 2018/0242317 | A1* | 8/2018 | Marinier | H04W 72/0446 |
| 2019/0045487 | A1* | 2/2019 | You | H04W 72/0446 |
| 2019/0098648 | A1* | 3/2019 | Liu | H04W 4/70 |

FOREIGN PATENT DOCUMENTS

| | | |
|---|---|---|
| CL | 201900803 | 6/2019 |
| CL | 201900817 | 6/2019 |
| CN | 101330486 A | 12/2008 |
| CN | 101882982 A | 11/2010 |
| CN | 101908955 A | 12/2010 |
| CN | 102056316 A | 5/2011 |
| CN | 102378373 A | 3/2012 |
| CN | 102740473 A | 10/2012 |
| CN | 102781095 A | 11/2012 |
| CN | 103688480 A | 3/2014 |
| CN | 104488342 A | 4/2015 |
| CN | 105827383 A | 8/2016 |
| CN | 105830363 A | 8/2016 |
| CN | 105830383 A | 8/2016 |
| CN | 105979597 A | 9/2016 |
| CN | 106067845 A | 11/2016 |
| CN | 106160984 A | 11/2016 |
| EP | 2639989 A1 | 9/2013 |
| RU | 2601738 C2 | 11/2016 |
| WO | 2018098683 A1 | 6/2018 |

OTHER PUBLICATIONS

Taiwan Office Action with English Translation for TW Application 106138253 dated Jun. 9, 2021. (53 pages).
Indonesia Office Action with English Translation for ID Application P00201905174 dated Jul. 16, 2021. (4 pages).
Qualcomm Incorporated, Downlink Control Channel Design for Shortened TTI, 3GPP TSG RAN WG1 #87, R1-1611638, Nov. 14-18, 2016. (9 pages).
Communication pursuant to Article 94(3) EPC for EP Application 16922921.8 dated Jun. 9, 2021. (11 pages).
First Japanese Office Action with English Translation for Application No. 2019-528548 dated Jan. 8, 2021.
3GPP TSG-RAN WG1 #87; R1 -1612312; Reno, USA, Nov. 14-18, 2016.
International Search Report of PCT/CN2016/108017 dated Aug. 28, 2017.
Singapore Invitation to Respond to Written Open for SG Application 11201904731Q dated Jul. 1, 2020.
3GPP TSG RAN WG1 Meeting #88 R1-1701552 Athens, Greece, Feb. 13-17, 2017.
3GPP TSG RAN WG1 Meeting #87; R1-1612544; Reno, USA, Nov. 14-18, 2016.
3GPP TSG RAN WG1 Meeting #87; R1-1611850; Reno, USA Nov. 14-18, 2016.
3GPP TSG RAN WG1 Meeting #87; R1-1611465; Reno, USA Nov. 14-18, 2016.
3GPP TSG RAN WG1 Meeting #87; R1-1611221; Reno, Nevada, USA, Nov. 14-18, 2016.
English translation of CN OA for CN application 201680090779.8 dated Mar. 27, 2020.
English translation of CL OA for CL application 2019001456 dated Mar. 12, 2020.
English translation of RU Notice of Allowance for RU application 2019119035/07 dated Apr. 15, 2020.
3GPP TSG RAN WG1 Meeting #87; Reno, USA, Nov. 14-18, 2016; R1-1611704.
3GPP TSG RAN WG1 Meeting #87; Reno, USA, Nov. 14-18, 2016; R1-1611700.
India Office Action for IN Application 201917015936 dated Sep. 17, 2020.
Brazil Office Action for BR Application BR112019011066-6 dated Sep. 9, 2020.
Extended European search report issued in corresponding European application No. 16922921.8 dated Aug. 20, 2019.
3GPP TSG RAN WG1 Meeting #86bis; R1-1609432 Lisbon, Portugal, Oct. 10-14, 2016.
Australian Examination Report for AU Application 2016431316 dated Sep. 21, 2021. (4 pages).
Israel Office Action with English Translation for IL Application 266879 dated Aug. 26, 2021. (5 pages).
Japanese Office Action with English Translation for JP Application 2019528548 dated Nov. 2, 2021. (6 pages).

* cited by examiner

```
                    ┌─────────┐
                    │  Start  │
                    └────┬────┘
                         │
200  ┌───────────────────┴───────────────────────┐
     │ A terminal device receives downlink control│
     │ information sent by a network device through│
     │ control resource areas in a time domain     │
     │ scheduling unit, the control resource areas │────── S210
     │ include multiple types of control resource  │
     │ areas, and different types of control       │
     │ resource areas are used for sending different│
     │ types of downlink control information, and a │
     │ first type of control resource areas in the  │
     │ multiple types of control resource areas     │
     │ include partial frequency domain resources   │
     │ pre-configured or semi-statically configured │
     │ on each OFDM symbol in the time domain       │
     │ scheduling unit                              │
     └───────────────────┬───────────────────────┘
                         │
                    ┌────┴────┐
                    │   End   │
                    └─────────┘
```

FIG. 8

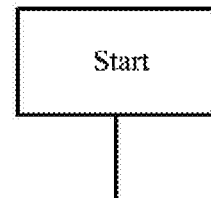

FIG. 9

INFORMATION TRANSMISSION METHOD, TERMINAL APPARATUS, AND NETWORK APPARATUS

CROSS-REFERENCE TO RELATED APPLICATION(S)

This application is a 371 application of International Application No. PCT/CN2016/10817, filed on Nov. 30, 216, the entire disclosure of which is hereby incorporated by reference.

TECHNICAL FIELD

The present disclosure relates to the field of communication, in particular to a method for transmitting information, a terminal device and a network device.

BACKGROUND

At present, 3rd Generation Partnership Project (3GPP) has defined three scenes for 5G: enhanced Mobile Broadband (eMBB), multiple Machine Type Communications (mMTC) and Ultra Reliable & Low Latency Communication (URLLC). Among them, eMBB corresponds to a heavy traffic mobile broadband service such as ultra-high definition video, mMTC corresponds to a large-scale Internet of Things service, and URLLC corresponds to a service such as unmanned driving and industrial automation that requires low latency and high reliability.

In an existing downlink control channel design, the transmission of the downlink control channel of URLLC usually adopts Time Division Multiplexing (TDM) with URLLC data, for example, occupying resources of the downlink control channel of eMBB. Since the TDM multiplexing is adopted, the low latency requirement of URLLC cannot be guaranteed. In other words, the existing design in which TDM multiplexing is adopted cannot meet requirements of the downlink control channel in a 5G URLLC application scenario.

SUMMARY

In view of this, implementations of the present disclosure provide a method for transmitting information, a network device and a terminal device, multiple types of downlink control information can be transmitted.

In an aspect, a method for transmitting information is provided, the method includes: receiving, by a terminal device, downlink control information sent by a network device through control resource areas in a time domain scheduling unit, wherein the control resource areas includes multiple types of control resource areas, different types of control resource areas are used for sending different types of downlink control information, and a first type of control resource area in the multiple types of control resource areas includes partial frequency domain resources pre-configured or semi-statically configured on each Orthogonal Frequency Division Multiplexing (OFDM) symbol in the time domain scheduling unit.

In a possible implementation, if the terminal device is a terminal device using a low latency service, receiving, by the terminal device, the downlink control information sent by the network device through control resource areas in the time domain scheduling unit, includes: acquiring, by the terminal device, a first type of downlink control information through the first type of control resource area, wherein the first type of downlink control information corresponds to a low latency service; and the terminal device receives first downlink data according to the first type of downlink control information.

In a possible implementation, if the terminal device is a terminal device using a common broadband service, receiving, by the terminal device, the downlink control information sent by the network device through the control resource areas in the time domain scheduling unit, includes: acquiring, by the terminal device, a second type of downlink control information through a second type of control resource area in the multiple types of control resource areas, wherein the second type of downlink control information corresponds to the common broadband service, and the second type of control resource area includes partial OFDM symbols in the time domain scheduling unit. The method further includes: receiving, by the terminal device, the first type of downlink control information through the first type of control resource area, and the first type of downlink control information corresponds to a low latency service.

In a possible implementation, the first type of downlink control information includes first control information used for transmitting the first downlink data and/or second control information used for transmitting configuration information, the configuration information includes third control information used for transmitting the first downlink data, and the third control information is different from the first control information.

In a possible implementation, the first control information and/or the third control information includes at least one of the following information: physical resources occupied by the first downlink data, a transmission format of the first downlink data, and information of a target terminal device of the first downlink data; and/or the second control information includes at least one of the following information: physical resources occupied by the configuration information, a transmission format of the configuration information, and information of a target terminal device of the configuration information.

In a possible implementation, the first type of downlink control information further includes indication information, the indication information is used for indicating whether the first downlink data and/or the configuration information exists, and receiving, by the terminal device, the first downlink data according to the first type of downlink control information, includes: receiving, by the terminal device, the first downlink data according to the first type of downlink control information when determining that the indication information indicates existence of the first downlink data. The method further includes: acquiring, by the terminal device, the configuration information according to the first type of downlink control information when determining that the indication information indicates existence of the configuration information.

If the terminal device finds that the first downlink data and/or the configuration information does not exist, or there is no data or configuration information related to the terminal device, the terminal device may no longer search for data or signaling of a low latency service.

In a possible implementation, at least two OFDM symbols in the time domain scheduling unit use different basic parameter sets; a width of the partial frequency domain resources on each OFDM symbol of the at least two OFDM symbols is the same, or the partial frequency domain resources on each OFDM symbol of the at least two OFDM symbols use a same number of subcarriers or a same number of resource blocks.

In a possible implementation, positions occupied by the partial frequency domain resources on at least two OFDM symbols in the time domain scheduling unit are different, and/or the partial frequency domain resources on a first OFDM symbol in the time domain scheduling unit are frequency domain resources which are distributed discontinuously.

In a possible implementation, a third type of control resource area in the multiple types of control resource areas is used for transmitting a synchronization signal or a broadcast channel.

In a possible implementation, resources of the first type of control resource area are different from resources of the second type of control resource area, and/or resources of the third type of control resource area are different from resources of the first type of control resource area.

In a possible implementation, the method further includes: determining, by the terminal device, whether the downlink control information includes information of the terminal device; and receiving, by the terminal device, downlink data of the terminal device according to the information of the terminal device when the downlink control information includes the information of the terminal device.

If the terminal device finds that there is no information of the terminal device, the terminal device may stop searching, thereby reducing the processing burden and battery power consumption of the terminal.

In a possible implementation, the method further includes: receiving, by the terminal device, allocation information of the multiple types of control resource areas sent by the network device.

In a possible implementation, the allocation information of the multiple types of control resource areas includes at least one of the following information: positions of resources occupied by the multiple types of control resource areas in the time domain scheduling unit, a basic parameter set adopted by each type of control resource area in the multiple types of control resource areas, and a transmission mode of each type of control resource area.

In a possible implementation, the time domain scheduling unit includes a subframe or a time slot, and/or a unit of the partial frequency domain resources is a physical resource block (PRB), a subcarrier, a subband, or a spectrum width.

In a possible implementation, the semi-static configuration is configured by system information or radio resource control (RRC) signaling.

In a possible implementation, the indication information is represented by a sequence.

In another aspect, a terminal device is provided. The terminal device includes a memory, a processor, a transceiver, a communication interface, and a bus system. The memory, the processor, and the transceiver are connected through the bus system. The memory is used for storing instructions. The processor is used for executing instructions stored in the memory, and when the instructions are executed, the processor is used for implementing the method of the second aspect, and controlling the transceiver to receive input data and information and output data, such as an operation result.

In another aspect, a computer storage medium is provided. The computer storage medium is used for storing computer software instructions used for the above method, which includes programs designed for performing the above aspect.

These and other aspects of the present application will be more readily understood in the following description of the implementations.

BRIEF DESCRIPTION OF DRAWINGS

FIG. 8 shows another schematic flowchart of a method for transmitting information according to an implementation of the present disclosure.

FIG. 9 shows a schematic diagram of a network device for transmitting information according to an implementation of the present disclosure.

DETAILED DESCRIPTION

Figure 1:
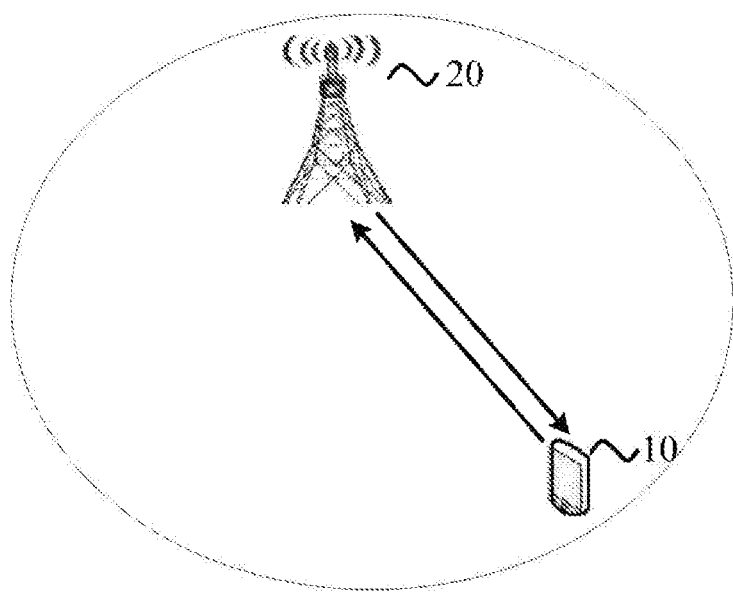
FIG. 1 shows a schematic diagram of a possible application scenario according to an implementation of the present disclosure.

The technical solutions in the implementations of the present disclosure will be described clearly and completely in the following with reference to the drawings in the implementations of the present disclosure.

The technical solutions of the implementations of the present disclosure may be applied to various communication systems, such as, a Global System of Mobile communication (GSM), a Code Division Multiple Access (CDMA) system, a Wideband Code Division Multiple Access (WCDMA) system, a General Packet Radio Service (GPRS) system, a long term evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a future 5G system.

In particular, the technical solutions of the implementations of the present disclosure can be applied to various communication systems based on non-orthogonal multiple access technologies, such as a Sparse Code Multiple Access (SCMA) system, and a Low Density Signature (LDS) system. Of course, the SCMA system and the LDS system may also be referred to as other names in the communication field. Further, the technical solutions of the implementations of the present disclosure can be applied to multicarrier transmission systems employing non-orthogonal multiple access technologies, such as an Orthogonal Frequency Division Multiplexing (OFDM) system based on the non-orthogonal multiple access technology, a Filter Bank Multi-Carrier (FBMC) system, a Generalized Frequency Division Multiplexing (GFDM) system, and a Filtered OFDM (F-OFDM) system.

A terminal device in an implementation of the present disclosure may refer to user equipment (UE), an access terminal, a subscriber unit, a subscriber station, a mobile station, a rover station, a remote station, a remote terminal, a mobile device, a user terminal, a terminal, a wireless communication device, a user agent, or a user device. An access terminal may be a cellular phone, a cordless phone, a session initiation protocol (SIP) phone, a wireless local loop (WLL) station, a personal digital assistant (PDA), a handheld device with a wireless communication function, a computing device or other processing device connected to a wireless modem, an on-board device, a wearable device, a terminal device in a future 5G network, or a terminal device in a future evolved Public Land Mobile Network (PLMN), etc., which is not restricted in implementations of the present disclosure.

A network device in an implementation of the present disclosure may be a device for communicating with a terminal device, and the network device may be a Base Transceiver station (BTS) in a GSM system or CDMA system, a NodeB (NB) in a WCDMA system, an evolutional NodeB (eNB or eNodeB) in an LTE system, or a wireless controller in a scenario of a Cloud Radio Access Network (CRAN), or the network device may be a relay station, an access point, an on-board device, a wearable device, a network device in a future 5G network, or a network device in a future evolved PLMN, etc., which is not restricted in implementations of the present disclosure.

FIG. 1 is a schematic diagram of an application scenario of an implementation of the present disclosure. A communication system in FIG. 1 may include a terminal device 10 and a network device 20. The network device 20 is used for providing a communication service for the terminal device 10 and connecting to a core network. The terminal device 10 accesses the network by searching for a synchronization signal, or broadcast signal, etc. sent by the network device 20, to communicate with the network. Arrows shown in FIG. 1 may represent uplink/downlink transmission through cellular links between the terminal device 10 and the network device 20.

With continuous development of communication technology, advantages of the fifth generation (5G) communication technology have been well reflected in scenarios like unmanned cars, virtual reality, industrial internet, large-scale sensor networks, etc. In addition, the application scenarios under 5G communication systems are more and more extensive, and the corresponding services are more and more. Besides, the design of downlink control channels for different services has attracted more attention.

Figure 2:
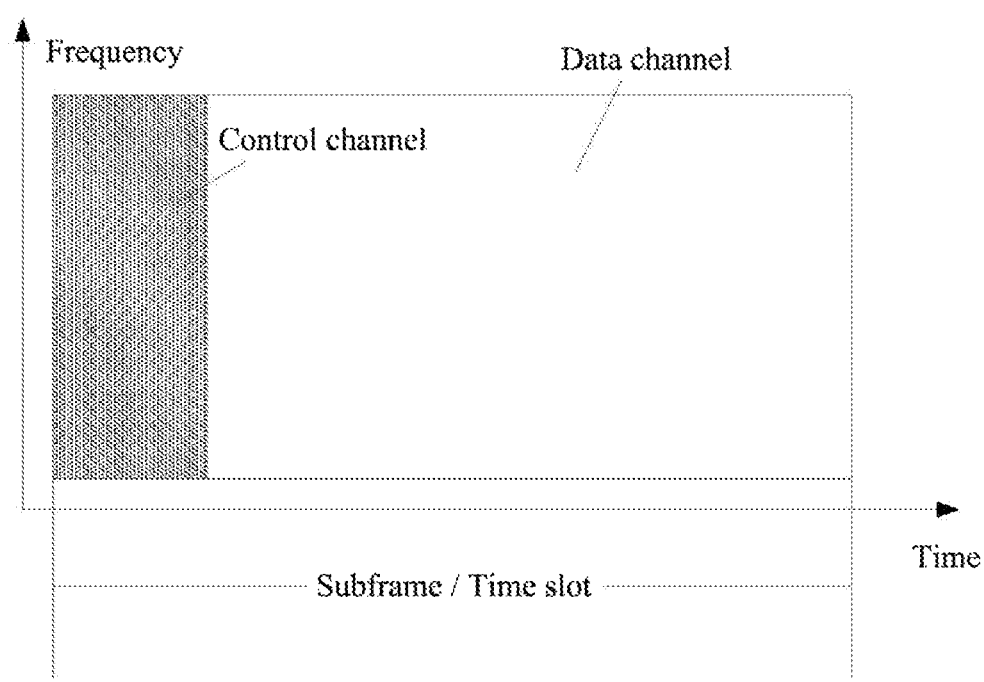
FIG. 2 shows transmission modes of PDCCH and PUSCH in LTE system.

At present, in LTE OFDM downlink systems, Physical Downlink Control Channel (PDCCH) and Physical Downlink Shared Channel (PDSCH) are usually transmitted by using time division multiplexing (TDM). As shown in FIG. 2, PDCCH may be sent on the first few OFDM symbols and PDSCH may be sent on the next few OFDM symbols in one subframe or time slot.

In a 5G system, besides common broadband services, there are low latency and high-reliability services, massive machine-type communication services, etc. Thus in one subframe or time slot as shown in FIG. 2, in addition to the transmission of the PDCCH for a common broadband service, a control channel for another service also needs to be transmitted. If the control channel for another service, such as a URLLC control channel, is transmitted by using resources for transmitting the PDCCH for the common broadband service as shown in FIG. 2, it is very likely that the requirement of this service is not met. For example, when the first few OFDM symbols in FIG. 2 are used for transmitting the URLLC control channel, since PDCCH and data (including eMBB data and URLLC data) are in TDM, and PDCCH cannot be transmitted frequently (usually transmitted once every 0.5 ms/1 ms), a URLLC service that may arrive at any time cannot be scheduled in time, and the low latency of the URLLC service cannot be guaranteed. For example, the first OFDM symbol of a subframe is allocated to transmit the URLLC control channel, if there is no URLLC service in the first OFDM symbol, but there is the URLLC service in the second OFDM symbol, then the incoming URLLC service cannot be processed in this subframe, and the URLLC service cannot be scheduled until the next subframe arrives. If the time domain density of PDCCH is increased, the processing burden and battery power consumption of an eMBB terminal will be increased, and the experience of an eMBB user will deteriorate. Moreover, if URLLC data is sent after one PDCCH, the eMBB terminal will not be notified until the next PDCCH, thereby the eMBB terminal is interfered by unknown sources, and performance is damaged seriously.

Solutions proposed in the implementations of the present disclosure can solve at least some of the above problems. The specific solutions of the implementations of the present disclosure will be described in detail below.

Figure 3:
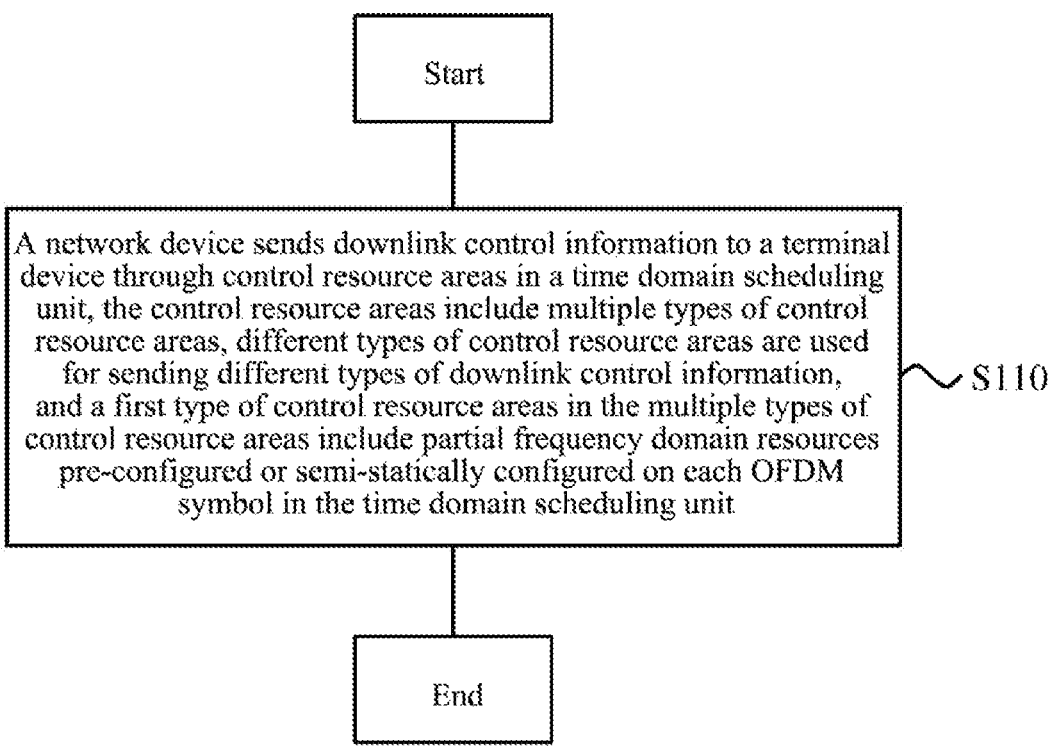
FIG. 3 is a schematic flowchart of a method for transmitting information according to an implementation of the present disclosure.

FIG. 3 shows a schematic flowchart of a method for transmitting information according to an implementation of the present disclosure. As shown in FIG. 3, the method 100 includes action S110.

In S110, a network device sends downlink control information to a terminal device through control resource areas in a time domain scheduling unit. The control resource areas include multiple types of control resource areas, different types of control resource areas are used for sending different types of downlink control information, and a first type of control resource area in the multiple types of control resource areas includes partial frequency domain resources pre-configured or semi-statically configured on each OFDM symbol in the time domain scheduling unit.

The following points need to be explained firstly:

I. A time domain scheduling unit herein refers to a scheduling unit of which a length in the time domain is one time domain scheduling unit while a length in the frequency domain is not restricted. For example, the length in the time domain may be one subframe or one time slot, or one wireless frame or one micro time slot, etc., and the length in the frequency domain may be 12 subcarriers or 24 subcarriers, or an entire system bandwidth, etc., which are not restricted in implementations of the present disclosure.

Figure 4:
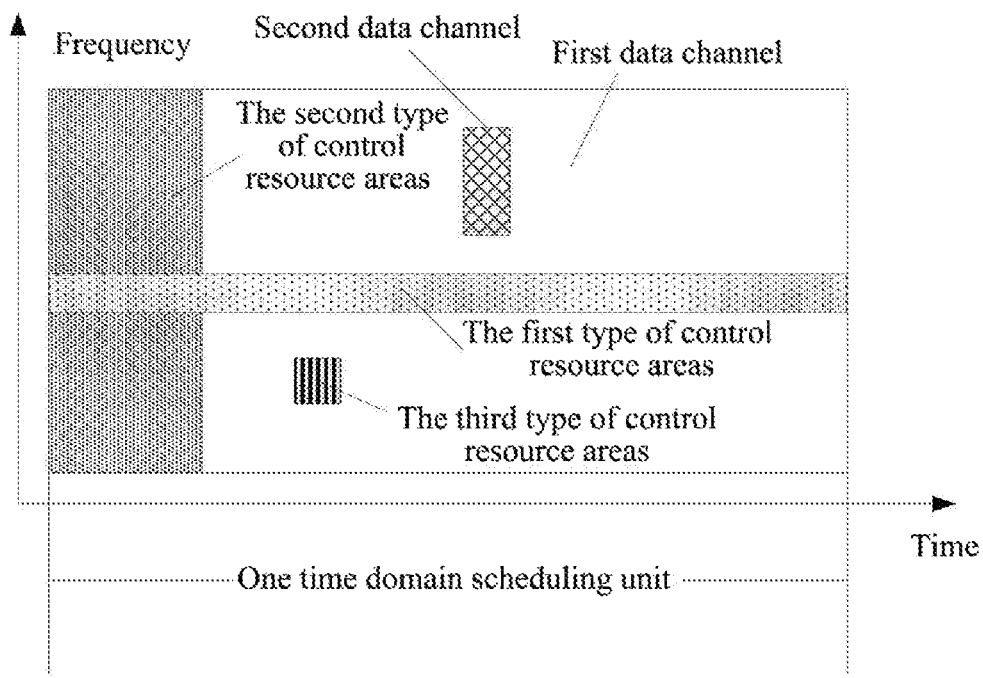
FIG. 4 shows a schematic diagram of configuring control resource areas according to an implementation of the present disclosure.

II. Control resource areas refer to resource areas used for transmitting control information, and multiple types of control resource areas herein correspond to different types of downlink control information. Specific description may be made with reference to FIG. 4. Three types of control resource areas are shown in FIG. 4, the first type of control resource area, the second type of control resource area, and the third type of control resource area. For example, the first type of control resource area may be used to transmit URLLC control information, the second type of control resource area may be used to transmit eMBB control information, and the third type of control resource area may be used to transmit a synchronization signal or a broadcast channel. It should be understood that what types of control information are transmitted by using the multiple types of control resource areas is based on the specific implementation, which are not restricted in implementations of the present disclosure.

III. The first type of control resource area includes partial frequency domain resources pre-configured or semi-statically configured on each OFDM symbol in the time domain scheduling unit, which means that frequency domain resources are configured on all time domain resources in a time domain scheduling unit. Although the adoption of dynamic shared resource scheduling greatly optimizes the allocation of system resources, each allocation needs a corresponding indication on a control channel, so the overhead of control channels is increased and the areas in which the terminal device performs blind detection on the control channels are increased. For a low latency service, resource utilization is not a principal concern. The principal requirement is to simplify the process of reading control signaling and realize low latency data reading. For this reason, in an implementation of the present disclosure, pre-configuration (also known as static configuration) or semi-static configuration is adopted to divide the control resource areas in a time domain scheduling unit, so that a shorter detection latency can be achieved.

Therefore, with the method for transmitting information provided by the implementation of the present disclosure, multiple types of downlink control information can be transmitted, and a design of the first type of control resource area can meet the requirement of the downlink control channel for transmitting the low latency service.

Optionally, in an implementation of the present disclosure, the network device sends downlink control information to the terminal device through multiple types of control resource areas in a time domain scheduling unit, including: when a service to be processed is a low latency service, the network device sends a first type of downlink control information to the terminal device through the first type of control resource area, and the first type of downlink control information corresponds to the low latency service.

Specifically, control information of a low latency service, such as URLLC control information, is transmitted on the first type of control resource area as shown in FIG. 3. In other words, Frequency Division Multiplexing (FDM) is used to multiplex the data of the low latency service and the control channel of the low latency service, and the control channel of the low latency service can be continuously transmitted in the time domain. For a terminal using a low latency service, the low latency service can be scheduled at any time, so that the minimum scheduling latency of the low latency service can be realized. For a terminal using a common broadband service, its control signaling reception is not affected at all, and the terminal using the common broadband service may also acquire the resource information of low latency service data in time by reading the control channel of the low latency service, thereby effectively avoiding or mitigating the interference from the low latency service.

It should be understood that in the above description, benefits of using the solution of an implementation of the present disclosure to transmit a low latency service are described by taking a URLLC service as an example. Other benefits brought by using the solution of the implementation of the present disclosure also belong to the present application, which is not restricted in implementations of the present disclosure.

Optionally, in an implementation of the present disclosure, the first type of downlink control information includes first control information for transmitting downlink data and/or second control information for transmitting configuration information, the configuration information includes third control information for transmitting the downlink data, and the third control information is different from the first control information.

Generally, downlink control information includes various configuration information, and indication information, etc. Specifically, it may include time-frequency resources occupied by data to be transmitted, a transmission format of the data to be transmitted, information (e.g., terminal identification) of a terminal device receiving the data to be transmitted, a basic parameter set adopted for the data to be transmitted, etc. The first type of downlink control information in an implementation of the present disclosure can be embodied in various ways.

First, the first type of downlink control information may include all the scheduling information of the data to be transmitted. This way is usually applied to a scenario where terminals have good processing performances and the number of terminals is not large, that is, the terminals do not have much pressure when acquiring all the scheduling information at once.

Figure 5:
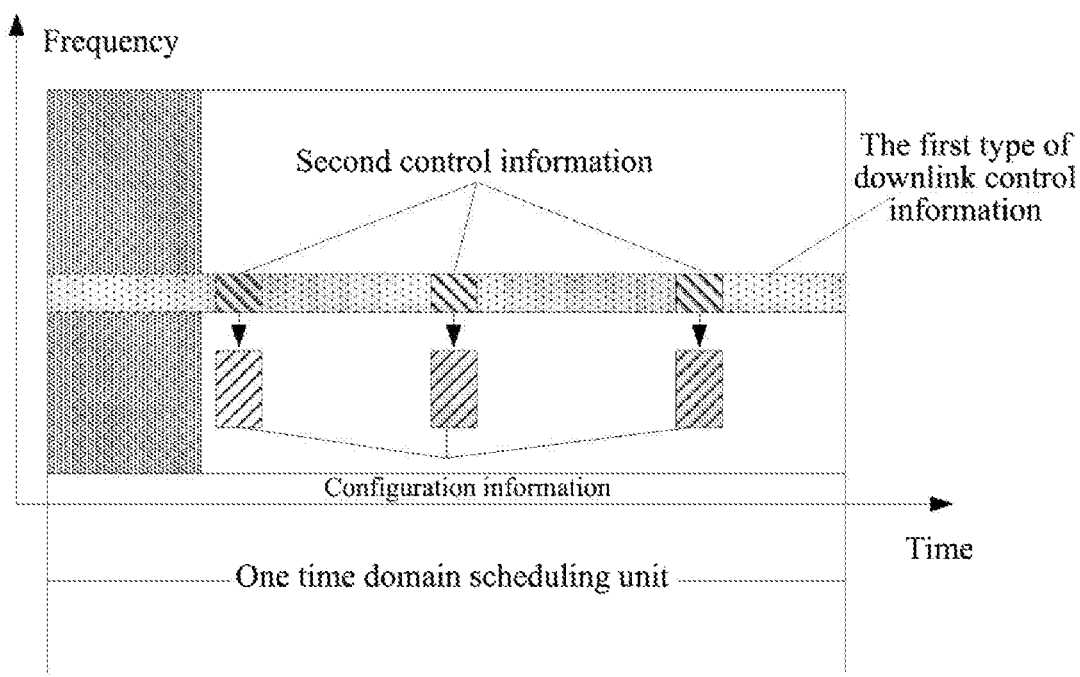
FIG. 5 shows another schematic block diagram of configuring control resource areas according to an implementation of the present disclosure.

Second, step-by-step processing may be adopted, that is, the first type of downlink control information may only include scheduling information of at least one piece of configuration information, and the at least one piece of configuration information is used to indicate all scheduling information of downlink data to be transmitted. Similarly, the scheduling information of the configuration information includes the time-frequency resources occupied by the configuration information, the transmission format of the configuration information, the information of the terminal device receiving the configuration information, and the basic parameter set adopted for the configuration information, etc. Hereinafter, a scheme for transmitting, step-by-step, the first type of downlink control information will be described in detail in combination with FIG. 5. As shown in FIG. 5, the first type of downlink control information is transmitted on all time domain resources shown in FIG. 5, and the first type of downlink control information includes multiple pieces of second control information, for example, there are three pieces of second control information, the multiple pieces of the second control information indicate the time-frequency resources occupied by all scheduling information for transmitting data to be transmitted, the transmission mode, the information of the target terminal device, etc. After receiving the first type of downlink control information, according to the carried second control information, a terminal device may firstly acquire configuration information, and then acquire information of data to be transmitted according to the acquired configuration information, so that data can be received according to the acquired information of data to be transmitted. In addition, in the step-by-step processing in an implementation of the present disclosure, the first type of downlink control information may include part of the scheduling information, and other scheduling information may be transmitted in a further indication. It should be understood that implementations of the present disclosure are not limited thereto. The step-by-step indication can speed up the terminal's acquisition of resource information of low latency service data, thereby reducing the processing burden and battery power consumption.

Optionally, in an implementation of the present disclosure, the first type of downlink control information further includes indication information, and the indication information is used for indicating whether the downlink data and/or the configuration information exists.

Specifically, the indication information may be represented by a sequence. For example, the network device may pre-agree that a sequence represents the existence and another sequence represents the inexistence. The length of the sequence may be equal to the number of subcarriers of the pre-configured frequency domain resources occupied by the first type of control resource area. The terminal device may determine whether downlink data to be transmitted and/or configuration information exists according to the indication information included in the first type of downlink control information. For example, if the terminal device finds that the downlink data and/or the configuration information does not exist, or there is no data or configuration information related to the terminal device, the terminal device may no longer search for data or signaling of a low latency service, so that the processing performance of the terminal can be further improved.

Optionally, in an implementation of the present disclosure, at least two OFDM symbols in a time domain scheduling unit use different basic parameter sets; a width of the partial frequency domain resources on each OFDM symbol of the at least two OFDM symbols is the same, or the partial frequency domain resources on each OFDM symbol of the at least two OFDM symbols use the same number of subcarriers or the same number of resource blocks.

The same or different basic parameter sets may be used in different symbols in a time domain scheduling unit. Herein the basic parameter set may include at least one of the following parameters: subcarrier spacing, the number of subcarriers corresponding to system bandwidth, the number of subcarriers corresponding to physical resource blocks (PRB), the symbol length of orthogonal frequency division multiplexing (OFDM), the number of points of Fast Fourier transform (FFT) or Inverse Fast Fourier transform (IFFT) used for generating OFDM signals, the number of OFDM symbols contained in a time slot/subframe/micro time slot, and a signal prefix length. The subcarrier spacing refers to a frequency spacing between adjacent subcarriers, such as 15 kHz, 60 kHz. The number of subcarriers under a specific bandwidth is, for example, the number of subcarriers corresponding to each possible system bandwidth. The number of subcarriers included in the PRB may be, for example, typically 12. The number of OFDM symbols contained in a time slot/subframe/micro time slot may be, for example, typically 7, 14 or 3. The signal prefix length is, for example, the time length of the cyclic prefix of the signal, or whether the cyclic prefix uses a regular CP or an extended CP. The first type of control resource area in different symbols may adopt the same frequency domain width, and the number of subcarriers or the number of resource blocks included can be adjusted according to the subcarrier spacing. For example, a subcarrier spacing included in the basic parameter set adopted by a first symbol is 15 kHz, and a subcarrier spacing included in the basic parameter set adopted by a second symbol is 30 kHz. If the frequency domain bandwidth pre-allocated in each symbol of the first type of control resource area is 180 kHz, the first type of control resource area occupies 12 subcarriers of the first symbol and 6 subcarriers of the second symbol. In addition, the first type of control resource area may use the same number of subcarriers or same number of resource blocks in different symbols, but the occupied frequency domain width is adjusted according to the subcarrier spacing. It should be understood that how to configure the first type of control resource area in an implementation of the present disclosure is illustrated, but implementations of the present disclosure are not limited thereto.

Optionally, in an implementation of the present disclosure, positions occupied by the partial frequency domain resources on at least two OFDM symbols in a time domain scheduling unit are different, and/or the partial frequency domain resources on a first OFDM symbol in the time domain scheduling unit are frequency domain resources which are distributed discontinuously.

Figure 6:
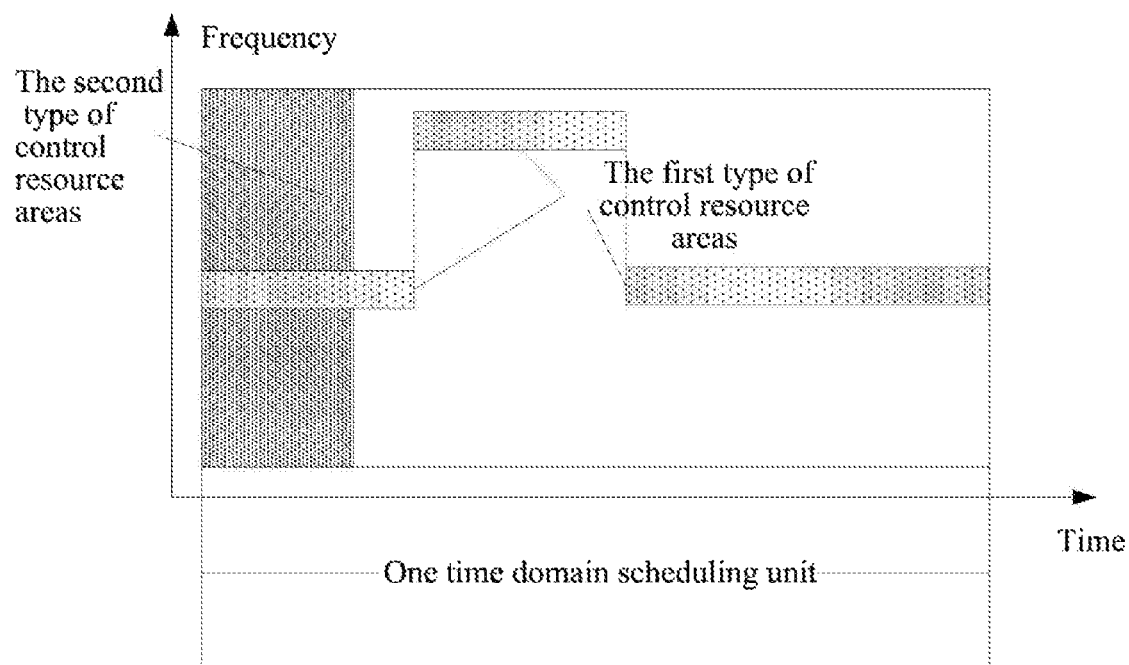
FIG. 6 shows still another schematic block diagram of configuring control resource areas according to an implementation of the present disclosure.
Figure 7:
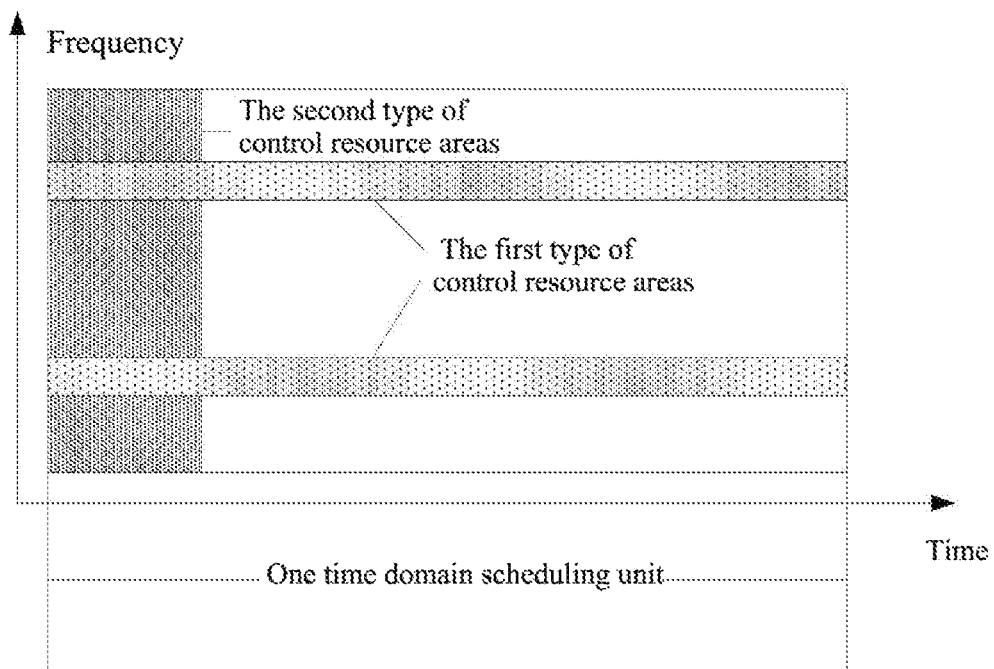
FIG. 7 shows still another schematic block diagram of configuring control resource areas according to an implementation of the present disclosure.

As shown in FIGS. 6 and 7, the first type of control resource area may occupy frequency domain resources at different positions in different symbols, and the first type of control resource area may occupy multiple nonadjacent frequency domain resources in one symbol.

Optionally, in an implementation of the present disclosure, the second type of control resource area in the multiple types of control resource areas includes frequency domain resources on partial OFDM symbols in the time domain scheduling unit, and sending, by the network device, the downlink control information to the terminal device through the control resource areas in the time domain scheduling unit includes: when a service to be processed is a common broadband service, the network device sends a second type of downlink control information to the terminal device through the second type of control resource area, and the second type of downlink control information corresponds to the common broadband service.

It should be understood that the low latency service herein refers to a specific service, such as a URLLC service, that has a high requirement on the latency as understood by those skilled in the art, or a service which requires the latency to be below a certain value, for example, a service which requires the latency to be below 1 ms may be referred to as a low latency service. The common broadband service herein refers to a specific service, such as an eMBB service, that does not have a requirement on the latency as understood by those skilled in the art, or a service of which the latency requirement is above a certain value, for example, a service of which the latency requirement is above 1 ms may be referred to as a common broadband service. It should also be understood that the division of the low latency service and the common broadband service here may be related to the system bandwidth and other factors, and the division of the low latency service and the common broadband service in different systems is different, for example, a service with a latency requirement of 2 ms may be a low latency service in a first system, but may be a common broadband service in a second system, which is not restricted in the present disclosure.

As described before, the technical solution in an implementation of the present disclosure can process various services timely. Therefore, in the aforementioned time domain scheduling unit, a type of control resource area may be configured specially for processing a common broadband service to transmit downlink control information, and TDM multiplexing may be adopted, and resources can be used flexibly, so as to make the frequency spectrum utilization rate of control signaling higher.

In addition, the third type of control resource area may be divided in the time domain scheduling unit specially for transmitting a synchronization signal, a broadcast channel, or some common control information, etc. It should be understood that the resources of the various types of control resource areas are assigned with priorities. For example, the priority of the synchronization signal, the broadcast channel or some common control information is higher than that of control information of the low latency service, and the priority of control information of the low latency service is higher than that of control information of the common broadband service. The network device may preferentially configure the third type of control resource area, and configure the first type of control resource area in the remaining resources, and further configure the second type of control resource area in the remaining resources excluding the first type of control resource area and the third type of control resource area.

In an implementation of the present disclosure, the network device may broadcast through system information or indicate through Radio Resource Control (RRC) after configuring multiple types of control resource areas in the time domain scheduling unit, and a unit of the configured frequency domain resources may be a physical resource block, a subcarrier, a subband, or a spectrum width.

Therefore, with the method for transmitting control signaling of a low latency service provided by the implementation of the present disclosure, it is not needed to wait for NR-PDCCH to schedule low latency services, and compared with a design based on 5G New Radio (NR)-PDCCH control channel, a low latency service starting at any OFDM symbol can be scheduled, and NR-PDCCH time domain density does not need to be increased, thus it does not bring overhead or complexity to a common broadband system.

FIG. 8 shows a schematic flowchart of a method 200 for transmitting information according to an implementation of the present disclosure. As shown in FIG. 8, the method 200 includes action S210.

In S210, a terminal device receives downlink control information sent by a network device through control resource areas in a time domain scheduling unit, wherein the control resource areas include multiple types of control resource areas, and different types of control resource areas are used for sending different types of downlink control information, and a first type of control resource area in the multiple types of control resource areas includes partial frequency domain resources pre-configured or semi-statically configured on each OFDM symbol in the time domain scheduling unit.

It should be understood that for the method for transmitting information on the terminal device side, the interaction with the network device and related characteristics and functions correspond to the related characteristics and functions of the network device side. For the sake of conciseness, they will not be repeated here.

Therefore, with the method for transmitting information provided by the implementation of the present disclosure, multiple types of downlink control information can be received, resource information of multiple types of service data can be acquired, and information about interference from the low latency service can be acquired at the fastest speed, so as to avoid or reduce the interference.

Optionally, in an implementation of the present disclosure, if the terminal device is a terminal device using a low latency service, receiving, by the terminal device, the downlink control information sent by the network device through the control resource areas in the time domain scheduling unit includes: the terminal device receives a first type of downlink control information through the first type of control resource area, wherein the first type of downlink control information corresponds to the low latency service; and the terminal device receives first downlink data according to the first type of downlink control information.

Specifically, a terminal device using a low latency service and a network device may agree in advance to use fixed resources in a time domain scheduling unit to transmit downlink control information corresponding to the terminal device of this type. Then, when the terminal device of this type has a service to transmit, the terminal device will perform blind detection in a pre-agreed resource area to acquire corresponding downlink control information. If the acquired downlink control information has downlink data of the terminal device, the terminal device may further receive its downlink data according to the acquired downlink control information.

Optionally, in an implementation of the present disclosure, if the terminal device is a terminal device using a common broadband service, receiving, by the terminal device, the downlink control information sent by the network device through the control resource areas in the time domain scheduling unit includes: the terminal device receives a second type of downlink control information through a second type of control resource area in the multiple types of control resource areas, wherein the second type of downlink control information corresponds to the common broadband service, and the second type of control resource area includes partial OFDM symbols in the time domain scheduling unit; the method also includes: the terminal device receives the first type of downlink control information through the first type of control resource area, and the first type of downlink control information corresponds to a low latency service.

Specifically, a terminal device using a common broadband service and a network device may agree in advance to use fixed resources in a time domain scheduling unit to transmit downlink control information corresponding to the terminal device of this type. Then, when the terminal device of this type has a service to transmit, the terminal device will perform blind detection in a pre-agreed resource area to acquire corresponding downlink control information. If the acquired downlink control information has downlink data of the terminal device, the terminal device may further receive its downlink data according to the acquired downlink control information. The terminal device of this type can also acquire the control information of a low latency service in the first type of control resource area, so as to acquire the information of the resources occupied by the low latency service. For example, an eMBB terminal may acquire whether the channel resources occupied by the downlink data of a URLLC terminal overlap with the channel resources occupied for transmitting eMBB data. If there is an overlap, the eMBB terminal may give up receiving the eMBB data of the overlapped part; if there is no overlap, the eMBB terminal may determine that there is no interference from the URLLC terminal, and all eMBB data are received as usual.

By acquiring the resource information of low latency services in a fixed resource area, terminals using common broadband services can acquire the information about the interference from low latency services at the fastest speed, so as to avoid or reduce interference.

Optionally, in an implementation of the present disclosure, the first type of downlink control information includes first control information used for transmitting the first downlink data and/or second control information used for transmitting configuration information, the configuration information includes third control information used for transmitting the first downlink data, and the third control information is different from the first control information.

Specifically, the terminal device may acquire the first control information in the first type of control resource area, and if the first type of control resource area only includes the first control information, the terminal device may acquire all scheduling information of downlink data corresponding to a low latency service according to the first control information. If the first type of control resource area includes the second control information, the terminal device may acquire the time-frequency resources occupied by all scheduling information corresponding to the low latency service, the transmission format, the information of the terminal device, etc., according to the second control information, the terminal device acquires all scheduling information corresponding to the low latency service on the time-frequency resources indicated by the second control information, and further acquires resource information of the low latency data based on the acquired all scheduling information. The first type of downlink control information may include both the first control information and the second control information, wherein the first control information and/or the third control information includes at least one of the following information: physical resources occupied by the first downlink data, a transmission format of the first downlink data, and information of a target terminal device of the first downlink data; and/or the second control information includes at least one of the following information: physical resources occupied by the configuration information, a transmission format of the configuration information, and information of a target terminal device of the configuration information.

Optionally, in an implementation of the present disclosure, the first type of downlink control information further includes indication information, the indication information is used for indicating whether the first downlink data and/or the configuration information exists, and the terminal device receives the first downlink data according to the first type of downlink control information, including: the terminal device receives the first downlink data according to the first type of downlink control information when determining that the indication information indicates existence of the first downlink data. The method also includes: when determining that the indication information indicates existence of the configuration information, the terminal device acquires the configuration information according to the first type of downlink control information.

Specifically, the terminal device may determine whether low latency data exists through the indication information. If there is no low latency data, the searching process ends. If there are low latency data, the terminal device may continue to judge whether the low latency data are low latency data of the terminal device itself. If the low latency data are not low latency data of the terminal device itself, the terminal device does not need to continue searching, so that the processing burden and battery power consumption of the terminal device can be reduced.

The division of the control resource areas is similar to that of the terminal device, and will not be repeated here for the sake of conciseness.

The terminal device may acquire the allocation information about the control resource areas from system information or RRC signaling, and the allocation information may include at least one of the following information: positions of resources occupied by the multiple types of control resource areas in the time domain scheduling unit, a basic parameter set adopted by each type of control resource area in the multiple types of control resource areas, and a transmission mode of each type of control resource area.

It should be understood that the interaction between the terminal device and the network device and the related characteristics and functions described with respect to the terminal device side correspond to the related characteristics and functions of the network device side, and will not be repeated here for the sake of conciseness.

It should be understood that in various implementations of the present disclosure, values of sequence numbers in the aforementioned processes do not indicate an order of execution, and the order of execution of various processes should be determined by their functions and internal logics, and should not constitute any limitation on implementation processes of implementations of the present disclosure.

Methods for transmitting information according to implementations of the present disclosure have been described in detail above. Apparatus for transmitting information according to implementations of the present disclosure will be described below with reference to FIGS. 9 to 12. Technical features described in the method implementations are applicable to the following apparatus implementations.

FIG. 9 shows a schematic diagram of a network device 300 for transmitting information according to an implementation of the present disclosure. As shown in FIG. 9, the terminal device 300 includes a sending unit 310.

The sending unit 310 is used for sending downlink control information to a terminal device through control resource areas in a time domain scheduling unit, the control resource areas include multiple types of control resource areas, different types of control resource areas are used for sending different types of downlink control information, and a first type of control resource area in the multiple types of control resource areas includes partial frequency domain resources pre-configured or semi-statically configured on each Orthogonal Frequency Division Multiplexing (OFDM) symbol in the time domain scheduling unit.

Therefore, the network device for transmitting information provided by an implementation of the present disclosure can transmit multiple types of downlink control information, and a design of the first type of control resource area can meet requirement on the downlink control channel for transmitting a low latency service.

Optionally, in an implementation of the present disclosure, the sending unit 310 is specifically used for sending a first type of downlink control information to the terminal device through the first type of control resource area when a service to be processed is a low latency service, and the first type of downlink control information corresponds to the low latency service.

Frequency Division Multiplexing (FDM) is used to multiplex the data of the low latency service and the control channel of the low latency service, and the control channel of the low latency service can be continuously transmitted in the time domain. For a terminal using a low latency service, the low latency service can be scheduled at any time, so that the minimum scheduling latency of the low latency service can be realized. For a terminal using a common broadband service, its control signaling reception is not affected at all, and the terminal using the common broadband service may also acquire the resource information of low latency service data in time by reading the control channel of the low latency service, and the information about the interference from the low latency service can be acquired at the fastest speed, so as to avoid or reduce the interference Optionally, in an implementation of the present disclosure, the first type of downlink control information includes first control information used for transmitting downlink data and/or second control information used for transmitting configuration information, the configuration information includes third control information used for transmitting the downlink data, and the third control information is different from the first control information.

By the step-by-step indication, the terminal's acquisition of resource information of low latency service data can be speeded up, thereby reducing the processing burden and battery power consumption.

Optionally, in an implementation of the present disclosure, the first control information and/or the third control information includes at least one of the following information: physical resources occupied by the downlink data, a transmission format of the downlink data, and information of a target terminal device of the downlink data; and/or the second control information includes at least one of the following information: physical resources occupied by the configuration information, a transmission format of the configuration information, and information of a target terminal device of the configuration information.

Optionally, in an implementation of the present disclosure, the first type of downlink control information further includes indication information, and the indication information is used for indicating whether the downlink data and/or the configuration information exists.

If the terminal device finds that the downlink data and/or the configuration information does not exist, or there is no data or configuration information related to the terminal device, the terminal device may no longer search for data or signaling of a low latency service, so that the processing performance of the terminal device can be further improved.

Optionally, in an implementation of the present disclosure, at least two OFDM symbols in the time domain scheduling unit use different basic parameter sets; a width of the partial frequency domain resources on each OFDM symbol of the at least two OFDM symbols is the same, or the partial frequency domain resources on each OFDM symbol of the at least two OFDM symbols use a same number of subcarriers or a same number of resource blocks.

Optionally, in an implementation of the present disclosure, positions occupied by the partial frequency domain resources on at least two OFDM symbols in the time domain scheduling unit are different, and/or the partial frequency domain resources on a first OFDM symbol in the time domain scheduling unit are frequency domain resources which are distributed discontinuously.

Optionally, in an implementation of the present disclosure, a second type of control resource area in the multiple types of control resource areas includes frequency domain resources on partial OFDM symbols in the time domain scheduling unit, and the sending unit 310 is specifically used for sending a second type of downlink control information to the terminal device through the second type of control resource area when a service to be processed is a common broadband service, and the second type of downlink control information corresponds to the common broadband service.

Optionally, in an implementation of the present disclosure, a third type of control resource area in the multiple types of control resource areas is used for transmitting a synchronization signal or a broadcast channel.

Optionally, in an implementation of the present disclosure, resources of the first type of control resource area are different from resources of the second type of control resource area, and/or resources of the third type of control resource area are different from resources of the first type of control resource area.

Optionally, in an implementation of the present disclosure, the time domain scheduling unit includes a subframe or a time slot, and/or a unit of the partial frequency domain resources is a physical resource block (PRB), a subcarrier, a subband, or a spectrum width.

Optionally, in an implementation of the present disclosure, the semi-static configuration is configured through system information or radio resource control (RRC) signaling.

Optionally, in an implementation of the present disclosure, the indication information is represented by a sequence.

It should be understood that the network device 300 for transmitting information according to the implementation of the present disclosure may correspond to a network device in a method implementation of the present disclosure, and the above and other operations and/or functions of each unit in the network device 300 are respectively for implementing the corresponding flows of the methods in FIGS. 3 to 7, and will not be repeated here for conciseness.

Figure 10:
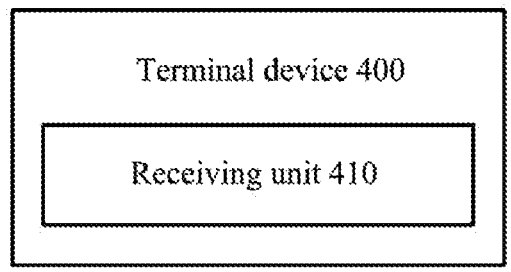
FIG. 10 shows a schematic diagram of a terminal device for transmitting information according to an implementation of the present disclosure.

FIG. 10 shows a schematic diagram of a terminal device for transmitting information according to an implementation of the present disclosure. As shown in FIG. 10, the terminal device 400 includes a receiving unit 410.

The receiving unit 410 is used for receiving downlink control information sent by a network device through control resource areas in a time domain scheduling unit, wherein the control resource areas include multiple types of control resource areas, different types of control resource areas are used for sending different types of downlink control information, and a first type of control resource area in the multiple types of control resource areas includes partial frequency domain resources pre-configured or semi-statically configured on each orthogonal frequency division multiplexing (OFDM) symbol in the time domain scheduling unit.

Therefore, with the terminal device for transmitting information provided by an implementation of the present disclosure, multiple types of control resource areas can be used for receiving multiple types of downlink control information, the resource information of multiple types of service data can be acquired, and the information about the interference from the low latency service can be acquired at the fastest speed, so as to avoid or reduce the interference.

Optionally, in an implementation of the present disclosure, if the terminal device is a terminal device using a low latency service, the receiving unit 410 is specifically used for receiving a first type of downlink control information through the first type of control resource area, wherein the first type of downlink control information corresponds to the low latency service. The receiving unit 410 is also used for receiving first downlink data according to the first type of downlink control information.

Optionally, in an implementation of the present disclosure, if the terminal device is a terminal device using a common broadband service, the receiving unit 410 is specifically used for receiving a second type of downlink control information through a second type of control resource area in the multiple types of control resource areas, wherein the second type of downlink control information corresponds to the common broadband service, and the second type of control resource area includes partial OFDM symbols in the time domain scheduling unit. The receiving unit 410 is further used for receiving the first type of downlink control information through the first type of control resource area, and the first type of downlink control information corresponds to a low latency service.

Optionally, in an implementation of the present disclosure, the first type of downlink control information includes first control information used for transmitting the first downlink data and/or second control information used for transmitting configuration information, the configuration information includes third control information used for transmitting the first downlink data, and the third control information is different from the first control information.

Optionally, in an implementation of the present disclosure, the first control information and/or the third control information includes at least one of the following information: physical resources occupied by the first downlink data, a transmission format of the first downlink data, and information of a target terminal device of the first downlink data; and/or the second control information includes at least one of the following information: physical resources occupied by the configuration information, a transmission format of the configuration information, and information of a target terminal device of the configuration information.

Optionally, in an implementation of the present disclosure, the first type of downlink control information further includes indication information, the indication information is used for indicating whether the first downlink data and/or the configuration information exists, and the receiving unit 410 receives the first downlink data according to the first type of downlink control information, including: receiving the first downlink data according to the first type of downlink control information when determining that the indication information indicates existence of the first downlink data. The receiving unit 410 is also used for receiving the configuration information according to the first type of downlink control information when determining that the indication information indicates existence of the configuration information.

Optionally, in an implementation of the present disclosure, at least two OFDM symbols in the time domain scheduling unit use different basic parameter sets; a width of the partial frequency domain resources on each OFDM symbol of the at least two OFDM symbols is the same, or the partial frequency domain resources on each OFDM symbol of the at least two OFDM symbols use a same number of subcarriers or a same number of resource blocks.

Optionally, in an implementation of the present disclosure, positions occupied by the partial frequency domain resources on at least two OFDM symbols in the time domain scheduling unit are different, and/or the partial frequency domain resources on a first OFDM symbol in the time domain scheduling unit are frequency domain resources which are distributed discontinuously.

Optionally, in an implementation of the present disclosure, a third type of control resource area in the multiple types of control resource areas is used for transmitting a synchronization signal or a broadcast channel.

Optionally, in an implementation of the present disclosure, resources of the first type of control resource area are different from resources of the second type of control resource area, and/or resources of the third type of control resource area are different from resources of the first type of control resource area.

Optionally, in an implementation of the present disclosure, the terminal device 400 further includes a determining unit 420 used for determining whether the downlink control information includes information of the terminal device. The receiving unit 410 is further used for receiving downlink data of the terminal device according to the information of the terminal device when the downlink control information includes the information of the terminal device.

Optionally, in an implementation of the present disclosure, the receiving unit 410 is further used for receiving allocation information of the multiple types of control resource areas sent by the network device.

Optionally, in an implementation of the present disclosure, the allocation information of the multiple types of control resource areas includes at least one of the following information: the positions of resources occupied by the multiple types of control resource areas in the time domain scheduling unit, a basic parameter set adopted by each type of control resource area in the multiple types of control resource areas, and a transmission mode of each type of control resource area.

Optionally, in an implementation of the present disclosure, the time domain scheduling unit includes a subframe or a time slot, and/or a unit of the partial frequency domain resources is a physical resource block (PRB), a subcarrier, a subband, or a spectrum width.

Optionally, in an implementation of the present disclosure, the semi-static configuration is configured by system information or radio resource control (RRC) signaling.

Optionally, in an implementation of the present disclosure, the indication information is represented by a sequence.

It should be understood that the terminal device 400 for transmitting information according to the implementation of the present disclosure may correspond to the terminal device in the method implementation of the present disclosure, and the above and other operations and/or functions of various units in the terminal device 400 are respectively for implementing the corresponding flow of the method in FIG. 8, which will not be repeated here for sake of conciseness.

Figure 11:
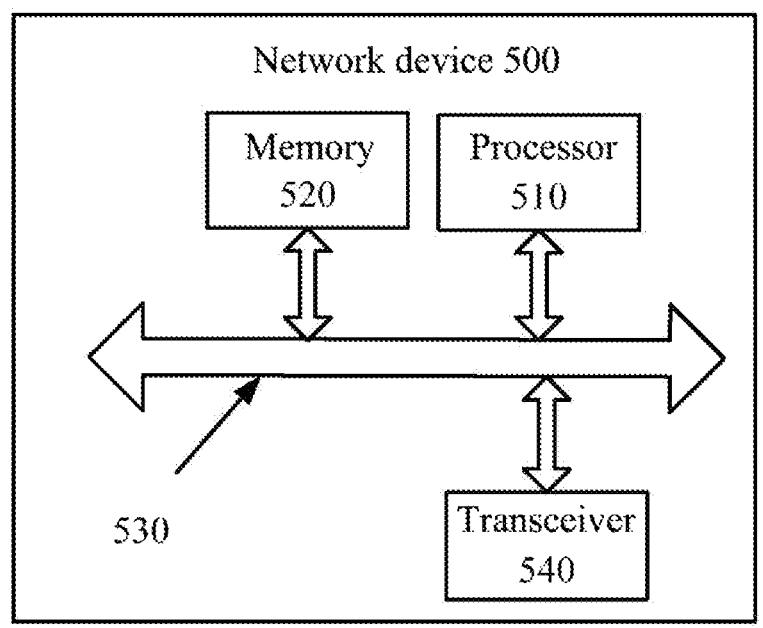
FIG. 11 shows another schematic diagram of a network device for transmitting information according to an implementation of the present disclosure.

As shown in FIG. 11, an implementation of the present disclosure provides a network device 500 for transmitting information. The network device 500 includes a processor 510, a memory 520, a bus system 530, and a transceiver 540, wherein the processor 510, the memory 520, and the transceiver 540 are connected through the bus system 530, the memory 520 is used for storing instructions, and the processor 510 is used for executing instructions stored in the memory 520 to control the transceiver 540 to transmit signals. The processor 510 is used for sending downlink control information to a terminal device through control resource areas in a time domain scheduling unit, the control resource areas include multiple types of control resource areas, different types of control resource areas are used for sending different types of downlink control information, and a first type of control resource area in the multiple types of control resource areas includes partial frequency domain resources pre-configured or semi-statically configured on each OFDM symbol in the time domain scheduling unit.

Therefore, for a network device for transmitting information provided by an implementation of the present disclosure, multiple types of downlink control information can be transmitted, and a design of the first type of control resource area can meet requirement on the downlink control channel for transmitting a low latency service.

It should be understood that in an implementation of the present disclosure, the processor 510 may be a Central Processing Unit (CPU), or the processor 510 may be other general purpose processors, digital signal processors (DSP), application specific integrated circuits (ASIC), Field Programmable Gate Arrays (FPGA), or other programmable logic device, discrete gate or transistor logic device, discrete hardware component, etc. The general purpose processor may be a microprocessor, or the processor may be any conventional processor or the like.

The memory 520 may include a read only memory and a random access memory and provide instructions and data to the processor 510. A portion of memory 520 may also include a non-volatile random access memory. For example, the memory 520 may also store device type information.

The bus system 530 may further include a power bus, a control bus, a status signal bus, etc., in addition to a data bus. However, for sake of conciseness, various buses are all denoted as the bus system 530 in the figure.

In an implementation process, the acts of the methods described above may be accomplished by integrated logic circuits of hardware in the processor 510 or instructions in a form of software. The acts of the method disclosed in combination with an implementation of the present disclosure can be directly accomplished by the execution of the hardware processor or accomplished by the combination of hardware and software modules in the decoding processor. The software modules may be located in typical storage medium in the art, such as a random access memory, flash memory, read-only memory, programmable read-only memory or electrically erasable programmable memory, or register. The storage medium is located in the memory 520, and the processor 510 reads the information in the memory 520 and accomplishes the acts of the above method in combination with its hardware. In order to avoid repetition, it will not be described in detail here.

It should be understood that the network device 500 for transmitting information according to the implementation of the present disclosure may correspond to the network device in implementations of the present disclosure and the network device 300, and may correspond to the network device performing a method according to an implementation of the present disclosure, and the above and other operations and/or functions of each unit in the network device 500 are respectively for implementing the corresponding flows of the methods in FIGS. 3 to 7, and will not be repeated here for conciseness.

Figure 12:
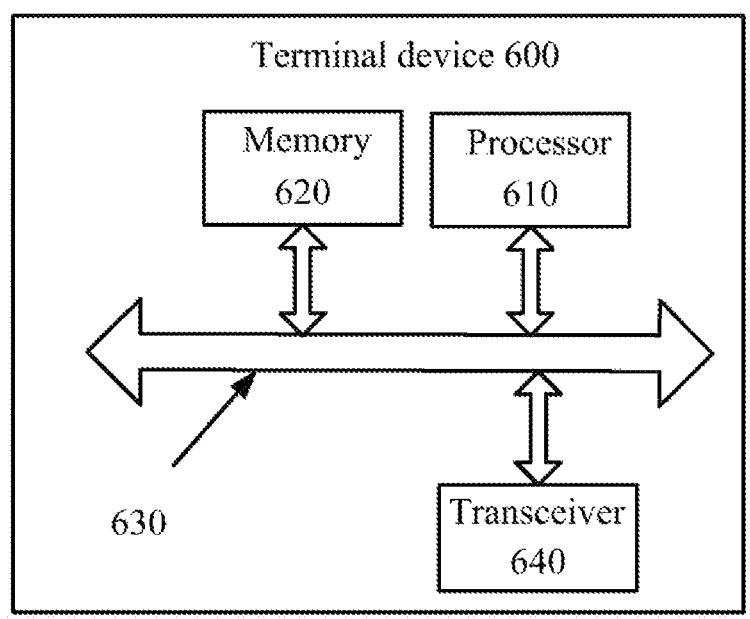
FIG. 12 shows another schematic diagram of a terminal device for transmitting information according to an implementation of the present disclosure.

As shown in FIG. 12, an implementation of the present disclosure provides a terminal device 600 for transmitting information. The terminal device 600 includes a processor 610, a memory 620, a bus system 630, and a transceiver 640, wherein the processor 610, the memory 620, and the transceiver 640 are connected through the bus system 630. The memory 620 is used for storing instructions, and the processor 650 is used for executing instructions stored in the memory 620 to control the transceiver 640 to transmit signals. The processor 610 is used for receiving downlink control information sent by a network device through control resource areas in a time domain scheduling unit, the control resource areas include multiple types of control resource areas, different types of control resource areas are used for sending different types of downlink control information, and a first type of control resource area in the multiple types of control resource areas includes partial frequency domain resources pre-configured or semi-statically configured on each OFDM symbol in the time domain scheduling unit.

Therefore, for a terminal device for transmitting information provided by the implementation of the present disclosure, multiple types of control resource areas can be used for receiving multiple types of downlink control information, the resource information of multiple types of service data can be acquired, and the information about the interference from the low latency service can be acquired at the fastest speed, so as to avoid or reduce the interference.

It should be understood that in an implementation of the present disclosure, the processor 610 may be a Central Processing Unit (CPU), or the processor 610 may be other general purpose processor, digital signal processor (DSP), application specific integrated circuit (ASIC), Field Programmable Gate Array (FPGA), or other programmable logic device, discrete gate or transistor logic device, discrete hardware component, etc. The general purpose processor may be a microprocessor, or the processor may be any conventional processor or the like.

The memory 620 may include a read only memory and a random access memory and provide instructions and data to the processor 610. A portion of memory 620 may also include a non-volatile random access memory. For example, the memory 620 may also store device type information.

The bus system 630 may further include a power bus, a control bus, a status signal bus, etc., in addition to a data bus. However, for sake of conciseness, various buses are all denoted as the bus system 630 in the figure.

In an implementation process, the acts of the methods described above may be accomplished by integrated logic circuits of hardware in the processor 610 or instructions in a form of software. The acts of the method disclosed in combination with an implementation of the present disclosure can be directly accomplished by the execution of the hardware processor or accomplished by the combination of hardware and software modules in the processor. The software modules may be located in typical storage medium in the art, such as a random access memory, flash memory, read-only memory, programmable read-only memory or electrically erasable programmable memory, or register. The storage medium is located in the memory 620, and the processor 610 reads the information in the memory 620 and accomplishes the acts of the above method in combination with its hardware. In order to avoid repetition, it will not be described in detail here.

It should be understood that the terminal device 600 for transmitting information according to the implementation of the present disclosure may correspond to the terminal device in implementations of the present disclosure and the terminal device 400, and may correspond to the terminal device performing a method according to an implementation of the present disclosure, and the above and other operations and/or functions of each unit in the terminal device 600 are respectively for implementing the corresponding flow of the method in FIG. 8, and will not be repeated here for conciseness.

It should be understood that the operations and/or functions of each unit in the terminal device provided by the implementation of the present disclosure correspond to the terminal device in the method respectively, and the interaction with the network device and related characteristics and functions correspond to the related characteristics and functions of the network device side. For the sake of conciseness, they will not be repeated here.

It should be understood that in implementations of the present disclosure, "B corresponding to A" means that B is associated with A, and B can be determined according to A. It should also be understood that determining B according to A does not mean determining B according to A only, but B may be determined according to A and/or other information.

Those of ordinary skill in the art will recognize that the exemplary elements and algorithm acts described in connection with the implementations disclosed herein can be implemented in electronic hardware, or a combination of computer software and electronic hardware. In order to explain interchangeability of software and hardware clearly, the composition of the examples and the acts in the examples are described generally with respect to functions in the above description. Whether these functions are performed in hardware or software depends on the specific application and design constraints of the technical solution. Skilled in the art may use different methods to implement the described functions for each particular application, but such implementation should not be considered to be beyond the scope of the present disclosure.

Those skilled in the art can clearly understand that for convenience and conciseness of description, corresponding processes in the aforementioned method implementations may be referred to for the specific working processes of the system, apparatus, and unit described above, which are not repeated here.

In several implementations provided by the present application, it should be understood that the disclosed system, apparatus and method may be implemented in other ways. For example, the apparatus implementations described above are only illustrative, for example, the division of the units is only a logical function division, and there may be other division manners in actual implementation. For example, multiple units or components may be combined or integrated into another system. In addition, various functional units in various implementations of the present disclosure may be integrated in one processing unit, or various units may be physically present separately, or two or more units may be integrated in one unit. The above integrated unit can be implemented in a form of hardware, or can be implemented in a form of software function unit.

The above integrated unit may be stored in a computer readable storage medium if implemented in a form of software functional units and sold or used as a separate product. Based on this understanding, the technical solution of the present disclosure, in essence, or the part contributing to the related art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage media include U disk, mobile hard disk, read-only memory (ROM), random access memory (RAM), magnetic disk or optical disk, and other media capable of storing program codes.

The foregoing are merely exemplary implementations of the present application, but the protection scope of the present application is not limited thereto. Any person skilled in the art can easily conceive various equivalent changes or substitutions within the technical scope disclosed by the present application.

What we claim is:

1. A method for transmitting information, comprising:
receiving, by a terminal device, downlink control information sent by a network device through control resource areas in a time domain scheduling unit, wherein the control resource areas comprises a plurality of types of control resource areas, different types of control resource areas are used for sending different types of downlink control information, and a first type of control resource area in the plurality of types of control resource areas comprises partial frequency domain resources semi-statically configured on each Orthogonal Frequency Division Multiplexing (OFDM) symbol in the time domain scheduling unit; and
receiving, by the terminal device, a first type of downlink control information through the first type of control resource area,
wherein when the terminal device is a second type of the terminal device, receiving, by the terminal device, the downlink control information sent by the network device through the control resource areas in the time domain scheduling unit comprises:
receiving, by the terminal device, a second type of downlink control information through a second type of control resource area in the plurality of types of control resource areas, and the second type of control resource area comprises partial OFDM symbols in the time domain scheduling unit.

2. The method of claim 1, wherein when the terminal device is a first type of the terminal device, receiving, by the terminal device, the downlink control information sent by the network device through control resource areas in the time domain scheduling unit, comprises:
receiving, by the terminal device, a first type of downlink control information through the first type of control resource area; and
the method further comprises:
receiving, by the terminal device, first downlink data according to the first type of downlink control information.

3. The method of claim 2, wherein the first type of downlink control information comprises first control information used for transmitting the first downlink data.

4. The method of claim 3, wherein the first control information comprises at least one of the following information: physical resources occupied by the first downlink data, a transmission format of the first downlink data, and information of a target terminal device of the first downlink data.

5. The method of claim 3, wherein the first type of downlink control information further comprises indication information, the indication information is used for indicating whether at least one of the first downlink data and configuration information exists, and receiving, by the terminal device, the first downlink data according to the first type of downlink control information, comprises:
receiving, by the terminal device, the first downlink data according to the first type of downlink control information when determining that the indication information indicates existence of the first downlink data; and
the method further comprises:
acquiring, by the terminal device, the configuration information according to the first type of downlink control information when determining that the indication information indicates existence of the configuration information.

6. The method of claim 5, wherein the indication information is represented by a sequence.

7. The method of claim 2, wherein the first type of the terminal device uses a low latency service, and the first type of downlink control information corresponds to the low latency service.

8. The method of claim 1, wherein at least two OFDM symbols in the time domain scheduling unit use different basic parameter sets; a width of the partial frequency domain resources on each of the at least two OFDM symbols is the same, or
the partial frequency domain resources on each of the at least two OFDM symbols use a same number of subcarriers or a same number of resource blocks.

9. The method of claim 1, wherein positions occupied by the partial frequency domain resources on at least two OFDM symbols in the time domain scheduling unit are different, or the partial frequency domain resources on a first OFDM symbol in the time domain scheduling unit are frequency domain resources which are distributed discontinuously.

10. The method of claim 1, wherein the method further comprises:
determining, by the terminal device, whether the downlink control information comprises information of the terminal device; and
receiving, by the terminal device, downlink data of the terminal device according to the information of the terminal device when the downlink control information comprises the information of the terminal device.

11. The method of claim 1, wherein the method further comprises:
receiving, by the terminal device, allocation information of the plurality of types of control resource areas sent by the network device.

12. The method of claim 11, wherein the allocation information of the plurality of types of control resource areas comprises at least one of the following information: positions of resources occupied by the plurality of types of control resource areas in the time domain scheduling unit, a basic parameter set adopted by each type of control resource area in the plurality of types of control resource areas, and a transmission mode of each type of control resource area.

13. The method of claim 1, wherein the time domain scheduling unit comprises a subframe or a time slot, or a unit of the partial frequency domain resources is a physical resource block (PRB), a subcarrier, a subband, or a spectrum width.

14. The method of claim 1, wherein the semi-static configuration is configured by system information or radio resource control (RRC) signaling.

15. The method of claim 1, wherein the second type of the terminal device uses a common broadband service, and the second type of downlink control information corresponds to the common broadband service.

16. A terminal device for transmitting information, comprising a memory, a processor, a transceiver, and a bus system, wherein the processor, the memory, and the transceiver are connected through the bus system,
wherein the memory is used for storing instructions,
wherein the processor is used for executing instructions stored in the memory to control the transceiver to receive downlink control information sent by a network device through control resource areas in a time domain scheduling unit, wherein the control resource areas comprises a plurality of types of control resource areas, different types of control resource areas are used for sending different types of downlink control information, and a first type of control resource area in the plurality of types of control resource areas comprises partial frequency domain resources semi-statically configured on each Orthogonal Frequency Division Multiplexing (OFDM) symbol in the time domain scheduling unit, and
wherein when the terminal device is a second type of the terminal device, the processor is specifically used for:
controlling the transceiver to receive a second type of downlink control information through a second type of control resource area in the plurality of types of control resource areas, and the second type of control resource area comprises partial OFDM symbols in the time domain scheduling unit; and
controlling the transceiver to receive a first type of downlink control information through the first type of control resource area.

17. The terminal device of claim 16, wherein when the terminal device is a first type of the terminal device, the processor is specifically used for:
controlling the transceiver to receive a first type of downlink control information through the first type of control resource area; and
controlling the transceiver to receive first downlink data according to the first type of downlink control information.

18. The terminal device of claim 17, wherein the first type of downlink control information comprises first control information used for transmitting the first downlink data.

19. The terminal device of claim 18, wherein the first control information comprises at least one of the following information: physical resources occupied by the first downlink data, a transmission format of the first downlink data, and information of a target terminal device of the first downlink data.

20. The terminal device of claim 18, wherein the first type of downlink control information further comprises indication information, the indication information is used for indicating whether at least one of the first downlink data and configuration information exists, and the processor is specifically used for controlling the transceiver to:
receive the first downlink data according to the first type of downlink control information when determining that the indication information indicates existence of the first downlink data; and
receive the configuration information according to the first type of downlink control information when determining that the indication information indicates existence of the configuration information.

21. The terminal device of claim 20, wherein the indication information is represented by a sequence.

22. The terminal device of claim 17, wherein the first type of the terminal device uses a low latency service, and the first type of downlink control information corresponds to the low latency service.

23. The terminal device of claim 16, wherein at least two OFDM symbols in the time domain scheduling unit use different basic parameter sets; a width of the partial frequency domain resources on each of the at least two OFDM symbols is the same, or
the partial frequency domain resources on each of the at least two OFDM symbols use a same number of subcarriers or a same number of resource blocks.

24. The terminal device of claim 16, wherein positions occupied by the partial frequency domain resources on at least two OFDM symbols in the time domain scheduling unit are different, or the partial frequency domain resources on a first OFDM symbol in the time domain scheduling unit are frequency domain resources which are distributed discontinuously.

25. The terminal device of claim 16, wherein the processor is further used for:
determining whether the downlink control information comprises information of the terminal device; and
controlling the transceiver to receive downlink data of the terminal device according to the information of the terminal device when the downlink control information comprises the information of the terminal device.

26. The terminal device of claim 16, wherein the processor is further used for:
controlling the transceiver to receive allocation information of the plurality of types of control resource areas sent by the network device.

27. The terminal device of claim 26, wherein the allocation information of the plurality of types of control resource areas comprises at least one of the following information: positions of resources occupied by the plurality of types of control resource areas in the time domain scheduling unit, a basic parameter set adopted by each type of control resource area in the plurality of types of control resource areas, and a transmission mode of each type of control resource area.

28. The terminal device of claim 16, wherein the time domain scheduling unit comprises a subframe or a time slot, or a unit of the partial frequency domain resources is a physical resource block (PRB), a subcarrier, a subband, or a spectrum width.

29. The terminal device of claim 16, wherein the semi-static configuration is configured by system information or radio resource control (RRC) signaling.

30. The terminal device of claim 16, wherein the second type of the terminal device uses a common broadband service, and the second type of downlink control information corresponds to the common broadband service.

31. A non-transitory computer storage medium, storing computer software instructions, which, when executed by a computer of a terminal device, enables the computer to:
receive downlink control information sent by a network device through control resource areas in a time domain scheduling unit, wherein the control resource areas comprises a plurality of types of control resource areas, different types of control resource areas are used for sending different types of downlink control information, and a first type of control resource area in the plurality of types of control resource areas comprises partial frequency domain resources semi-statically configured on each Orthogonal Frequency Division Multiplexing (OFDM) symbol in the time domain scheduling unit; and
receive a first type of downlink control information through the first type of control resource area,
wherein when the terminal device is a second type of the terminal device, receive the downlink control information sent by the network device through the control resource areas in the time domain scheduling unit comprises:
receive a second type of downlink control information through a second type of control resource area in the plurality of types of control resource areas, and the second type of control resource area comprises partial OFDM symbols in the time domain scheduling unit.

* * * * *